(12) United States Patent
Schmidt et al.

(10) Patent No.: US 8,181,759 B2
(45) Date of Patent: May 22, 2012

(54) LOADING DOCK BUMPER WITH TWO-PHASE RESISTANCE

(75) Inventors: Timothy J. Schmidt, Dubuque, IA (US);
Ronald P. Snyder, Dubuque, IA (US);
Jason Miller, Aiden, IA (US); Don Grant, Dubuque, IA (US); Paul Maly, Mequon, WI (US)

(73) Assignee: Rite-Hite Holding Corporation, Milwaukee, WI (US)

( * ) Notice: Subject to any disclaimer, the term of this patent is extended or adjusted under 35 U.S.C. 154(b) by 491 days.

(21) Appl. No.: 11/321,830

(22) Filed: Dec. 29, 2005

(65) Prior Publication Data

US 2007/0151819 A1   Jul. 5, 2007

(51) Int. Cl.
*F16F 7/12*   (2006.01)
*F16M 13/00*   (2006.01)
(52) U.S. Cl. ............ 188/371; 188/377; 52/173.2
(58) Field of Classification Search .......... 188/371, 188/377; 52/173.2; 248/560, 562, 636
See application file for complete search history.

(56) References Cited

U.S. PATENT DOCUMENTS

| | | | |
|---|---|---|---|
| 2,489,869 A | 11/1949 | Dunn | |
| 2,649,295 A | 8/1953 | Schuyler | |
| RE24,276 E | 2/1957 | Schuyler | |
| 3,203,002 A | 8/1965 | McGuire | |
| 3,268,199 A * | 8/1966 | Kordyban et al. | 220/632 |
| 3,375,625 A | 4/1968 | Edkins et al. | |
| 3,381,484 A | 5/1968 | Laughlin | |
| 3,440,673 A | 4/1969 | Kelley | |
| 3,469,717 A | 9/1969 | Bolt | |
| 3,469,809 A * | 9/1969 | Fekete et al. | 248/562 |
| 3,493,984 A | 2/1970 | Reinhard | |
| 3,570,033 A | 3/1971 | Hovestad et al. | |
| 3,610,609 A * | 10/1971 | Sobel | 267/140 |
| 3,644,952 A | 2/1972 | Hatch | |
| 3,659,835 A * | 5/1972 | Peterson | 267/136 |
| 3,665,997 A | 5/1972 | Smith et al. | |
| 3,840,930 A | 10/1974 | Wanddell | |
| 3,841,683 A * | 10/1974 | Toro | 293/107 |
| 3,921,241 A | 11/1975 | Smith | |
| 3,933,111 A | 1/1976 | von Bose et al. | |
| 3,934,380 A | 1/1976 | Frommelt et al. | |

(Continued)

FOREIGN PATENT DOCUMENTS

CA   2158535   3/1997

(Continued)

OTHER PUBLICATIONS

English translation of EP-0168767.*

(Continued)

*Primary Examiner* — Melody Burch
(74) *Attorney, Agent, or Firm* — Hanley, Flight & Zimmerman, LLC (57) ABSTRACT

A bumper for use at a loading dock has two ranges of front-to-back movement: one range for sealing the gap that might otherwise exist between the rear edge of a truck and the front face of the bumper and a second range for absorbing the impact of the truck backing into the dock. In some cases, a spring provides a relatively light sealing force between the bumper and the truck, and a compressible core provides a much greater impact-absorbing force that helps stop the rearward movement of the truck. In some embodiments, the bumper pivots by gravity when operating in the sealing range.

10 Claims, 11 Drawing Sheets

U.S. PATENT DOCUMENTS

| | | | |
|---|---|---|---|
| 3,935,684 A | 2/1976 | Frommelt et al. | |
| 3,964,422 A | 6/1976 | Boyd | |
| 4,098,211 A | 7/1978 | Files et al. | |
| 4,420,849 A | 12/1983 | Alten | |
| 4,509,730 A | 4/1985 | Shtarkman | |
| 4,559,089 A | 12/1985 | Dromsky et al. | |
| 4,628,850 A | 12/1986 | Day et al. | |
| 4,682,382 A | 7/1987 | Bennett | |
| 4,744,121 A | 5/1988 | Swessel et al. | |
| 4,823,421 A | 4/1989 | Kleynjans et al. | |
| 4,844,213 A | 7/1989 | Travis | |
| 4,854,258 A | 8/1989 | Hausmann et al. | |
| 4,893,576 A | 1/1990 | Day et al. | |
| 5,013,272 A | 5/1991 | Watkins | |
| 5,088,143 A | 2/1992 | Alexander | |
| 5,094,905 A | 3/1992 | Murray | |
| 5,110,660 A | 5/1992 | Wolf et al. | |
| 5,247,897 A | 9/1993 | Pepp | |
| 5,264,259 A | 11/1993 | Satoh et al. | |
| 5,269,248 A | 12/1993 | Lee | |
| 5,450,643 A | 9/1995 | Warner | |
| 5,452,489 A | 9/1995 | Gelder et al. | |
| 5,644,812 A | 7/1997 | Neufeldt et al. | |
| 5,651,155 A | 7/1997 | Hodges et al. | |
| 5,658,633 A * | 8/1997 | Di Biase | 428/68 |
| 5,775,044 A | 7/1998 | Styba et al. | |
| 5,832,554 A | 11/1998 | Alexander | |
| 5,881,414 A | 3/1999 | Alexander | |
| 5,996,291 A | 12/1999 | Styba et al. | |
| 6,006,389 A | 12/1999 | Alexander | |
| 6,062,548 A * | 5/2000 | Nagao et al. | 267/30 |
| 6,070,283 A | 6/2000 | Hahn | |
| 6,120,871 A * | 9/2000 | De Biase | 428/68 |
| 6,209,857 B1 | 4/2001 | Berends | |
| 6,272,799 B1 | 8/2001 | Ashelin et al. | |
| 6,318,773 B2 | 11/2001 | Storer | |
| 6,360,394 B1 | 3/2002 | Hahn | |
| 6,497,076 B1 | 12/2002 | van de Wiel et al. | |
| 6,634,049 B2 | 10/2003 | Hahn et al. | |
| 6,832,403 B2 | 12/2004 | Hahn et al. | |
| 2002/0112418 A1* | 8/2002 | Thill et al. | 52/173.2 |
| 2002/0157195 A1 | 10/2002 | Alexander | |
| 2005/0102929 A1 | 5/2005 | Hoffmann et al. | |
| 2007/0152389 A1 | 7/2007 | Kloppenburg et al. | |
| 2007/0152390 A1 | 7/2007 | DiBiase | |

FOREIGN PATENT DOCUMENTS

| | | |
|---|---|---|
| CA | 2572522 | 6/2007 |
| CH | 685117 | 3/1995 |
| DE | 1684569 | 3/1971 |
| DE | 2800128 | 7/1979 |
| DE | 3018932 | 11/1981 |
| DE | 3242511 | 5/1984 |
| DE | 29503742 | 6/1995 |
| DE | 29600207 | 2/1996 |
| DE | 19612135 | 10/1997 |
| DE | 29716877 | 1/1998 |
| DE | 29804117 | 5/1998 |
| DE | 10313268 | 3/2004 |
| EP | 0040388 | 11/1981 |
| EP | 0168767 | 1/1986 |
| EP | 168767 A2 * | 1/1986 |
| FR | 1151730 | 2/1958 |
| FR | 1161537 | 9/1958 |
| FR | 2686913 | 8/1993 |
| FR | 2841883 | 1/2004 |
| GB | 1161537 | 8/1969 |
| WO | 02070382 | 9/2002 |

OTHER PUBLICATIONS

VHL Vertically Movable Bottom Pad and Detail (copy), Blueprint Nos. 692-0125 and 692-0126; VHL Bottom Pads and VHL Bottom Pad detail; Frommelt Industries, Inc., dated Oct. 7, 1988, 2 pages.

VHL Vertically-moving Bottom Pad (Meijer pad), Drawing No. 692-0029; Adjustable Bottom Pad; Frommelt Industires, Inc., dated Oct. 17, 1985; 1 page.

Hafa Spring-Loaded Bumper Literature; Hafa GmbH technical Drawing; "Hohenbeweglicher Anfahrpuffer"; and accompanying memo dated Nov. 1995, 3 pages with a 3 page English translation.

Loading Dock Seal; "Loading Dock Seal" Brochure, Kinnear—Division of Harsco Corp., 1978, 4 pages.

Loading Systems Spec Sheet; "Loading Systems Mobile Dock Bumper RB 250M"; dated circa 1993; showing a vertically-adjustable spring-loaded dock bumper, 1 page.

PowerRamp Hydraulic Dock Leveler System Brochure; two-page "Power Ramp XL" brochure, circa Feb. 2004, 2 pages.

Super Seal Dock Sales Catalog; "Super Seal Dock Seals" Catalog 11160/SU; Super Seal Mfg. Ltd.; no date listed, but stamped "received" by the USPTO on Aug. 29, 1989, 8 pages.

EOD Steel-faced bumper; Assembly drawing of steel-faced bumper for EOD (edge-of-dock) leveler; Genquip Corporation; Dated Feb. 24, 2000 and evidencing sales of event date; 1 page.

Patent Cooperation Treaty, "International Search Report", issued by the International Searching Authority in connection with International PCT application Serial No. PCT/IB2006/004288, mailed May 2, 2008 (7 pages).

Patent Cooperation Treaty, "Written Opinion of the International Searching Authority", issued by the International Searching Authority in connection with counterpart International PCT application PCT/IB2006/004288, mailed May 2, 2008 (4 pages).

Patent Cooperation Treaty, "International Search Report", issued by the International Searching Authority in connection with counterpart International PCT application Serial No. PCT/US2006/062617, mailed Jul. 11, 2008, 2008 (7 pages).

International Searching Authority, "Written Opinion of the International Searching Authority", issued by the International Searching Authority in connection with International PCT application Serial No. PCT/US2006/062617, mailed Jul. 11, 2008 (6 pages).

International Bureau, "International Preliminary report on Patentability" issued in connection with International application Serial No. PCT/US2006/062617, mailed Aug. 21, 2008 (7 pages).

Vestil Manufacturing Corp., http://www.vestilmfg.com/products/Idsol/dock_bumpers.htm, Wayback Date: Mar. 29, 2001, Model B-1213-4PF (6 pages).

United States Patent and Trademark Office, "Final Office Action," issued in connection with U.S. Appl. No. 11/321,675, mailed Aug. 18, 2008, 34 pages.

United States Patent and Trademark Office, "Notice of Allowance," issued in connection with U.S. Appl. No. 11/321,807, mailed May 1, 2009, 10 pages.

United States Patent and Trademark Office, "Non-Final Office Action," issued in connection with U.S. Appl. No. 11/321,807, mailed Oct. 9, 2008, 18 pages.

Canadian Intellectual Property Office, "Office Action," issued in connection with application serial No. 2,572,522, mailed Jan. 29, 2009, 3 pages.

United States Patent and Trademark Office, "Non-Final Office Action," issued in connection with U.S. Appl. No. 11/321,675, mailed Nov. 1, 2007, 13 pages.

Canadian Patent Office, "Notice of Allowance," issued in connection with Canadian application serial No. 2,572,522, issued Jun. 2, 2010, 1 page.

* cited by examiner

LOADING DOCK BUMPER WITH TWO-PHASE RESISTANCE

FIELD OF THE DISCLOSURE

The present disclosure generally pertains to loading dock bumpers, and more specifically to a bumper with multiple levels of resistance.

DESCRIPTION OF RELATED ART

A typical loading dock of a building includes an exterior doorway with an elevated platform for loading and unloading vehicles, such as trucks and trailers. In some cases, a loading dock may include a dock leveler to compensate for a height difference that may exist between the loading dock platform and an adjacent bed of a truck or trailer. Dock levelers typically include a deck whose front edge can be raised or lowered to the approximate height of the truck bed. An extension plate or lip may extend outward from the deck's front edge to span the gap between the rear of the truck bed and the front edge of the deck, thereby providing a path that allows personnel and material handling equipment to readily move on and off the truck bed during loading and unloading operations.

Dock bumpers are often installed near the doorway for several reasons. They can protect the face of the building from vehicle impact; they can protect the rear end of the truck from damage; they can prevent a dock seal from being over compressed by a vehicle backing into the dock, and/or in cases where the dock includes a dock leveler, they can establish a predetermined minimum distance between the rear of the vehicle and the dock leveler so that the dock leveler has clearance to operate. Bumpers are typically made of a molded polymer such as rubber or a stack of rubber pads stamped out of old tires, conveyor belt material, or the like. The stack of rubber pads can be clamped between two steel plates. The plates hold the pads together and provide a way for installing the bumper to the loading dock. Bumpers are usually installed near the bottom of the doorway, adjacent either side of the dock leveler lip and protrude a few inches out from the face of the dock where they can be abutted by the rear of the vehicle.

To avoid having vehicle 18 bounce off bumper 22 while operating within its sealing range 36, the lower restorative force 40 provided by spring 42 is of magnitude that is appreciably less than that of the high restorative force 46 provided by core 44 when faceplate 26 is at compressed position 34. High restorative force 46 is preferably at least twice as great as lower restorative force 40 when faceplate 26 is at compressed position 34.

To protect the interior of both the building and truck from the weather, many loading docks also include a dock seal or shelter installed around the perimeter of the doorway. Dock seals and shelters help seal the gap that may exist between the building and the rear end of the truck. While the dock seal or shelter seals the upper and two lateral edges of the doorway, the dock leveler lip and the bumpers help seal the lower edge of the doorway. If the truck, however, stops short of reaching the bumper, bounces off the bumper, or is not sitting squarely against both bumpers, an air gap may still exist between the lower rear edge of the truck and one or both bumpers.

Although various foam seals have been developed to help seal gaps that may exist near the bumpers, such seals tend to be expensive. Moreover, seals in the area around the bumpers are susceptible to being pinched, crushed and damaged by substantial compressive loads caused by a massive truck backing up against the bumpers.

Consequently, a need exists for a method or apparatus that is both durable and cost effective in sealing a gap that may exist between the lower rear edge of a truck and the front face of a bumper.

SUMMARY OF THE DISCLOSURE

In some embodiments, a loading dock bumper has two ranges of front-to-back movement: one range for closing the gap that might otherwise exist between the rear edge of the truck and the front face of the bumper; and a second range for absorbing and transmitting the impact of the truck backing into the dock.

In some embodiments, a loading dock bumper pivots by gravity to close a gap that may otherwise exist between the rear edge of the truck and the front face of the bumper.

In some embodiments, a bumper seals relatively lightly against the rear edge of the truck when the truck is spaced a certain range of distance away from the face of the dock, and the bumper presses much harder against the truck when the truck is within a certain distance of the dock face.

In some embodiments, a spring urges the bumper in sealing contact against the rear edge of the truck, and a compressible core helps absorb and transmit the impact of the truck backing into the dock.

In some embodiments, a bumper includes a rugged metal faceplate yet can provide a relatively light sealing force against the rear edge of a truck.

DESCRIPTION

Figure 1:
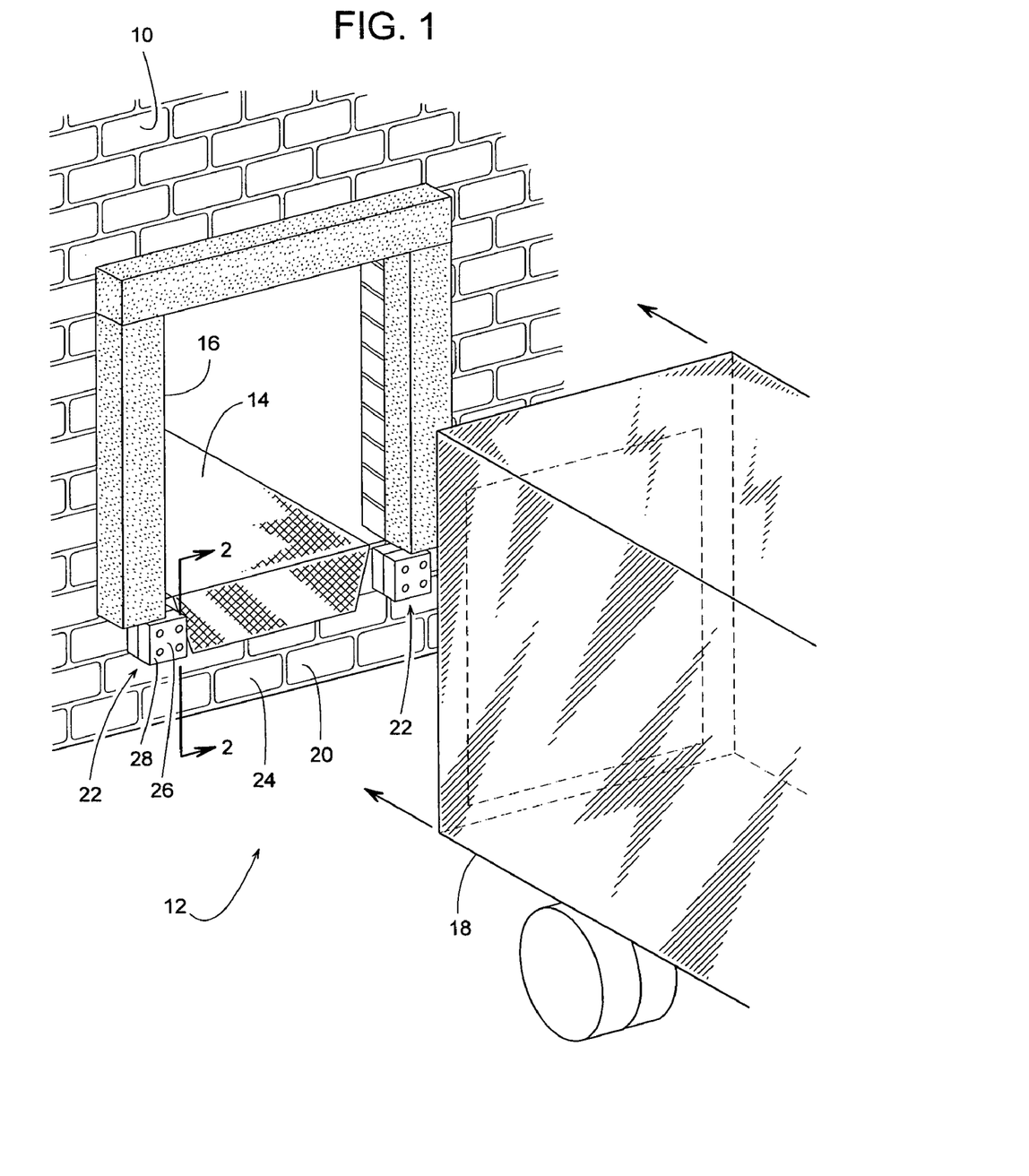
FIG. 1 is a perspective view of a vehicle backing into loading dock.

FIG. 1 shows a building 10 with a loading dock 12 that includes a dock leveler 14 and a dock seal 16. To absorb and/or transmit the impact from a vehicle 18 backing into the dock, to ensure adequate operating clearance between a lip 20 of dock leveler 14 and the back of vehicle 18, and/or to protect dock seal 16 from being over compressed by the back end of vehicle 18, one or more bumpers 22 can be attached to a dock wall 24, dock leveler 14, or some other suitable mounting surface of the loading dock.

In addition to being able to absorb the impact of vehicle 18 and transmit the resulting force to the dock wall, bumper 22 can extend its metal faceplate 26 to help maintain sealing contact with a rear edge of vehicle 18 even when vehicle 18 is not pressing tightly against the bumper. The sealing contact closes what would otherwise be an air gap that could pass air between the inside and outside of the building.

Figure 3:
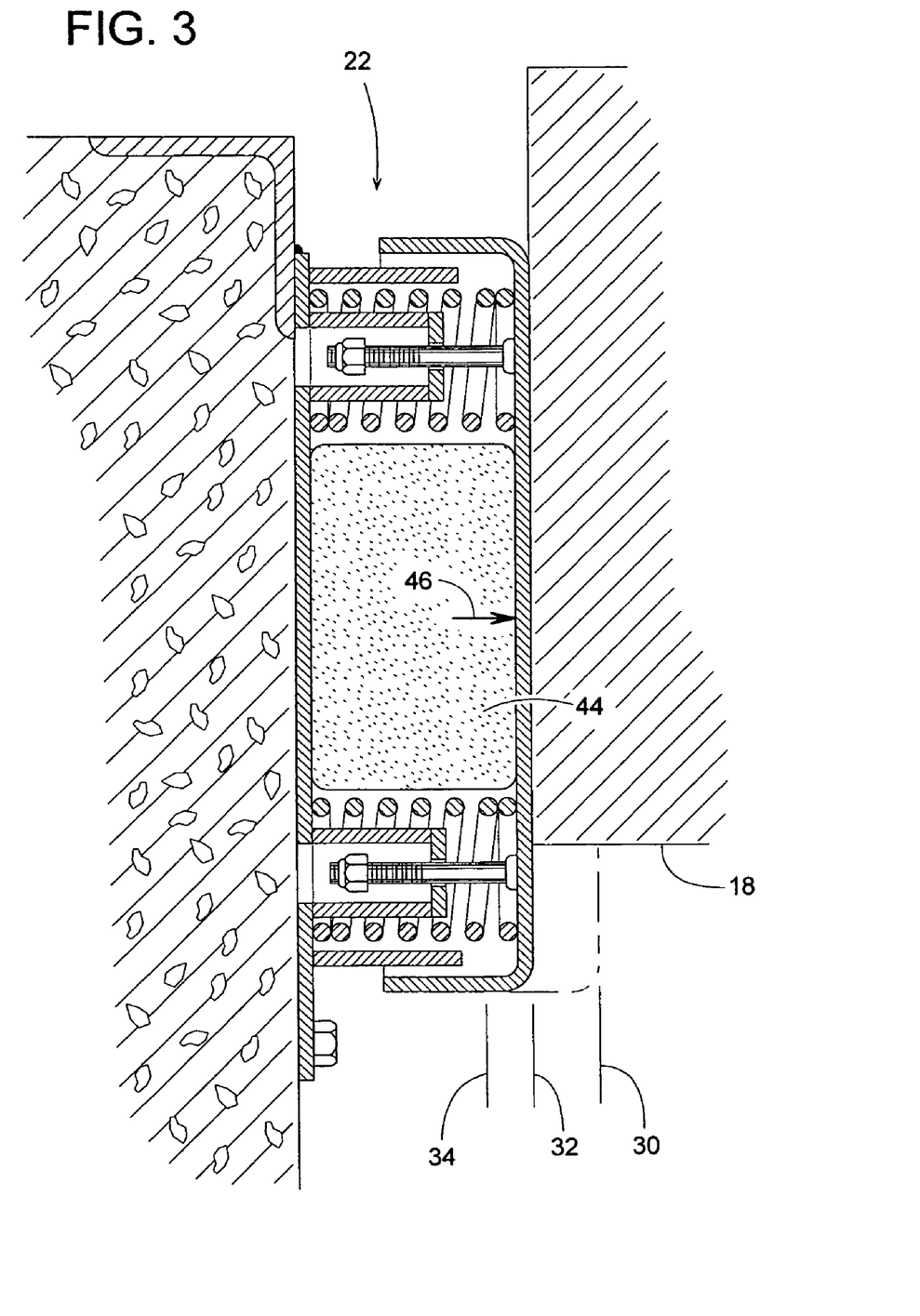
FIG. 3 is a cross-sectional view similar to FIG. 2 but showing the bumper at an intermediate position.
Figure 4:
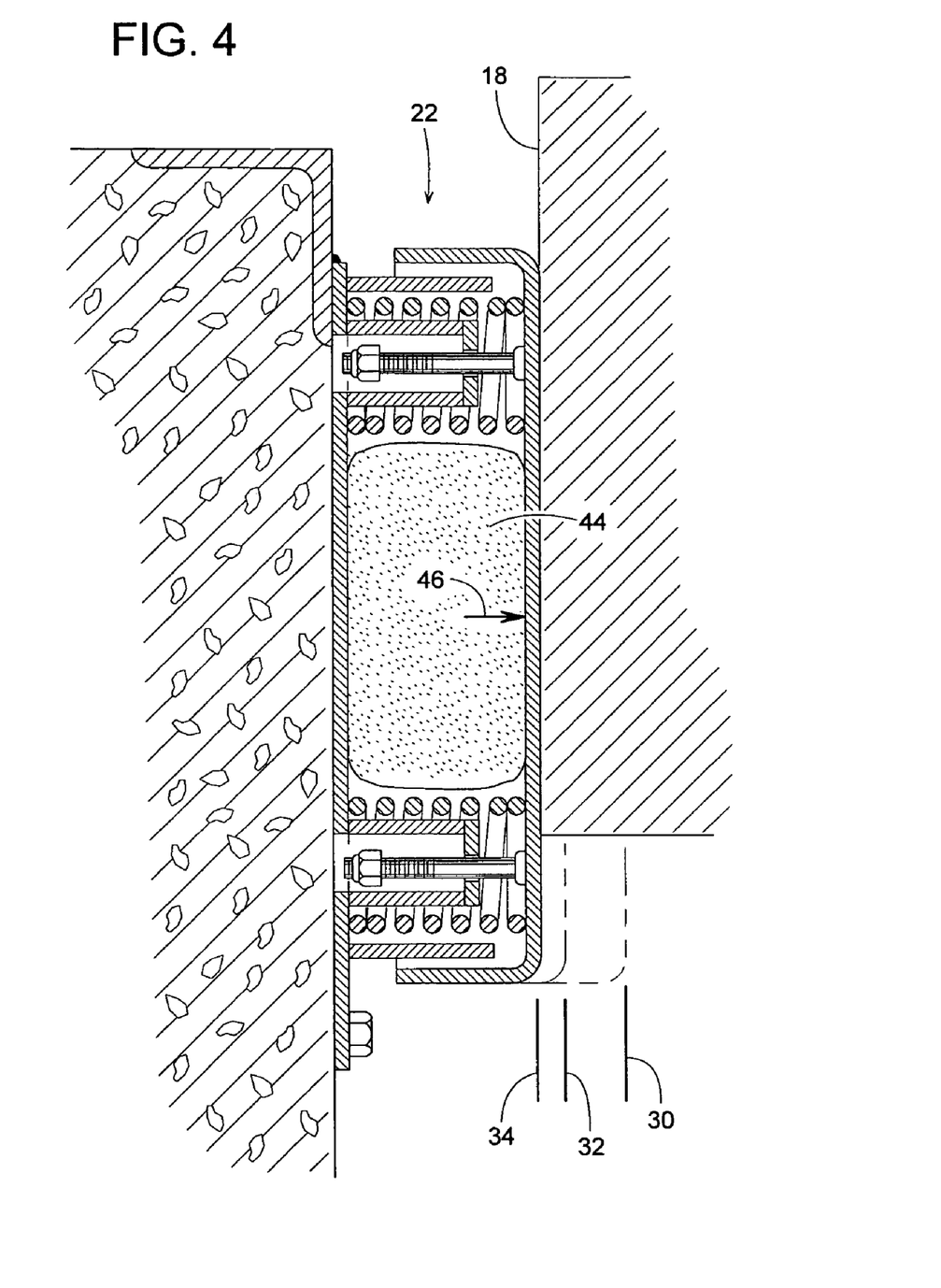
FIG. 4 is a cross-sectional view similar to FIG. 2 but showing the bumper at a compressed position.

To this end, bumper 22 has a faceplate with an impactable surface 28 that is movable to a normally extended position 30 (FIG. 2), an intermediate position 32 (FIG. 3), and a compressed position 34 (FIG. 4). When faceplate 26 is between normally extended position 30 and intermediate position 32, bumper 22 is operating in a sealing range 36. And when faceplate 26 is between intermediate position 32 and compressed position 34, bumper 22 is operating in an impact-absorbing range 38.

Figure 2:
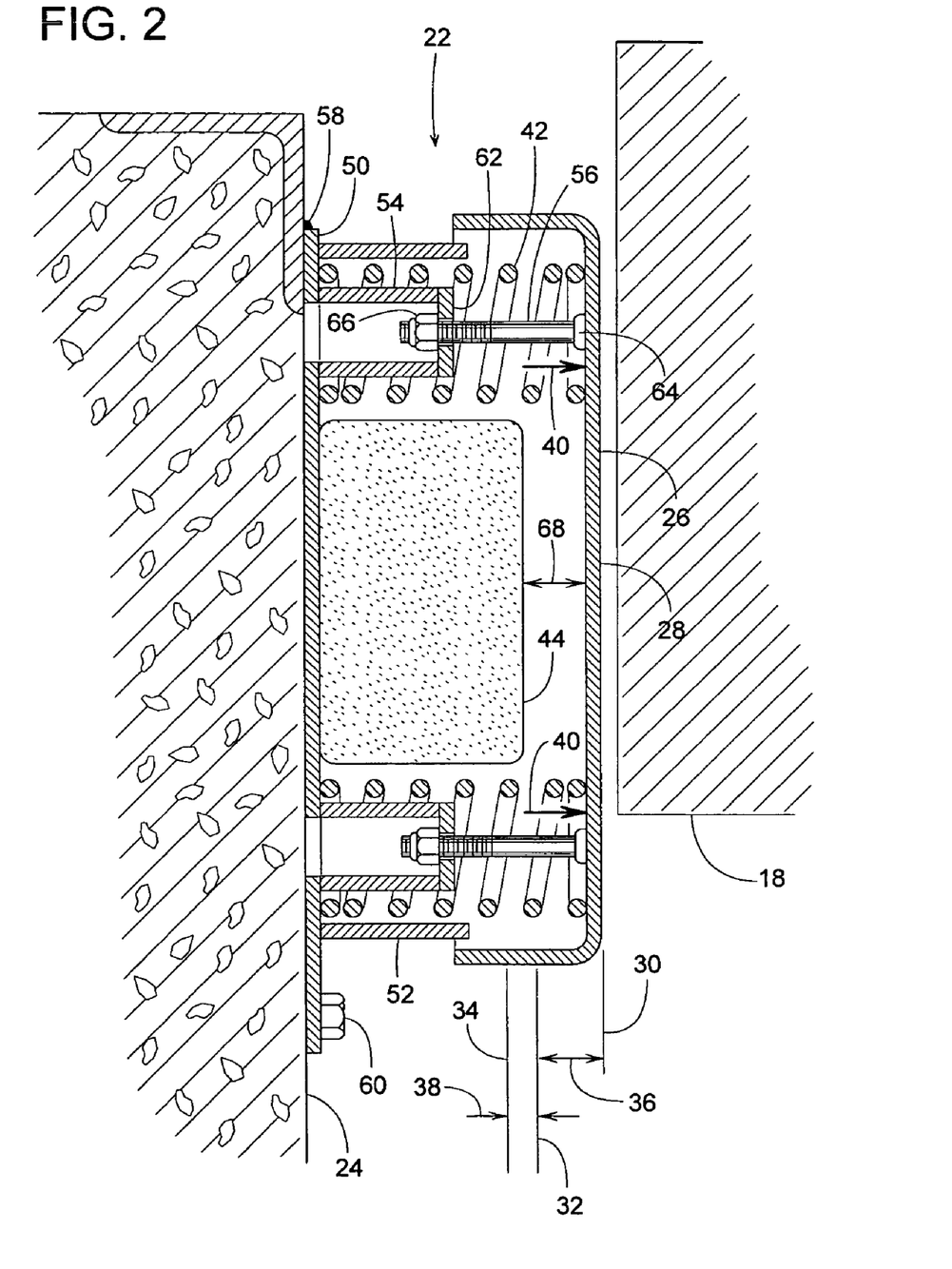
FIG. 2 is a cross-sectional view taken along line 2-2 of FIG. 1 with the bumper shown in a normally extended position.

A typical sequence of operation might begin with vehicle 18 backing into dock 12, as shown in FIGS. 1 and 2. At this point, faceplate 26 is held at the normally extended position by a relatively light restorative force 40 (lower restorative force) provided by, for example, a restorative member such as a spring 42. In some cases, restorative force 40 may be provided by gravity, which will be explained later. When a restorative member is used for providing force 40, the restorative member could be any appropriate structure, examples of which include, but are not limited to, helical compression spring 42, polyurethane spring, foam rubber, gas-filled bladder, etc.

Vehicle 18 first engages faceplate 26 at its normally extended position 30. As vehicle 18 continues to back up, vehicle 18 overcomes force 40 and pushes faceplate 26 from its normally extended position 30 to intermediate position 32.

At intermediate position 32, a compressible core 44 begins exerting a more substantial restorative force 46 (high restorative force) that opposes and absorbs the vehicle's force of impact. In this example, compressible core 44 comprises one or more resiliently compressible polymeric pads; however, other examples of core 44 include, but are not limited to, a spring, or another type of compressible material. In this context, "compressible" indicates that core 44 will be compressed by the backing vehicle as it transmits the force of that vehicle to the dock wall and then return to a relaxed shape when the force is removed. While all materials have some degree of compressibility, compressible core 44 is intended to compress substantially more than the relatively rigid/incompressible metal faceplate that overlays compressible core 44.

If vehicle 18 continues moving back from intermediate position 32 of FIG. 3, core 44 compresses until the brakes of vehicle 18 stops the vehicle or until restorative force 46 increases to a magnitude that equals the vehicle's rearward force. When restorative force 46 increases to the magnitude of the vehicle's rearward force, restorative force 46 stops vehicle 18 followed, perhaps, by some forward bounce of vehicle 18.

Figure 5:
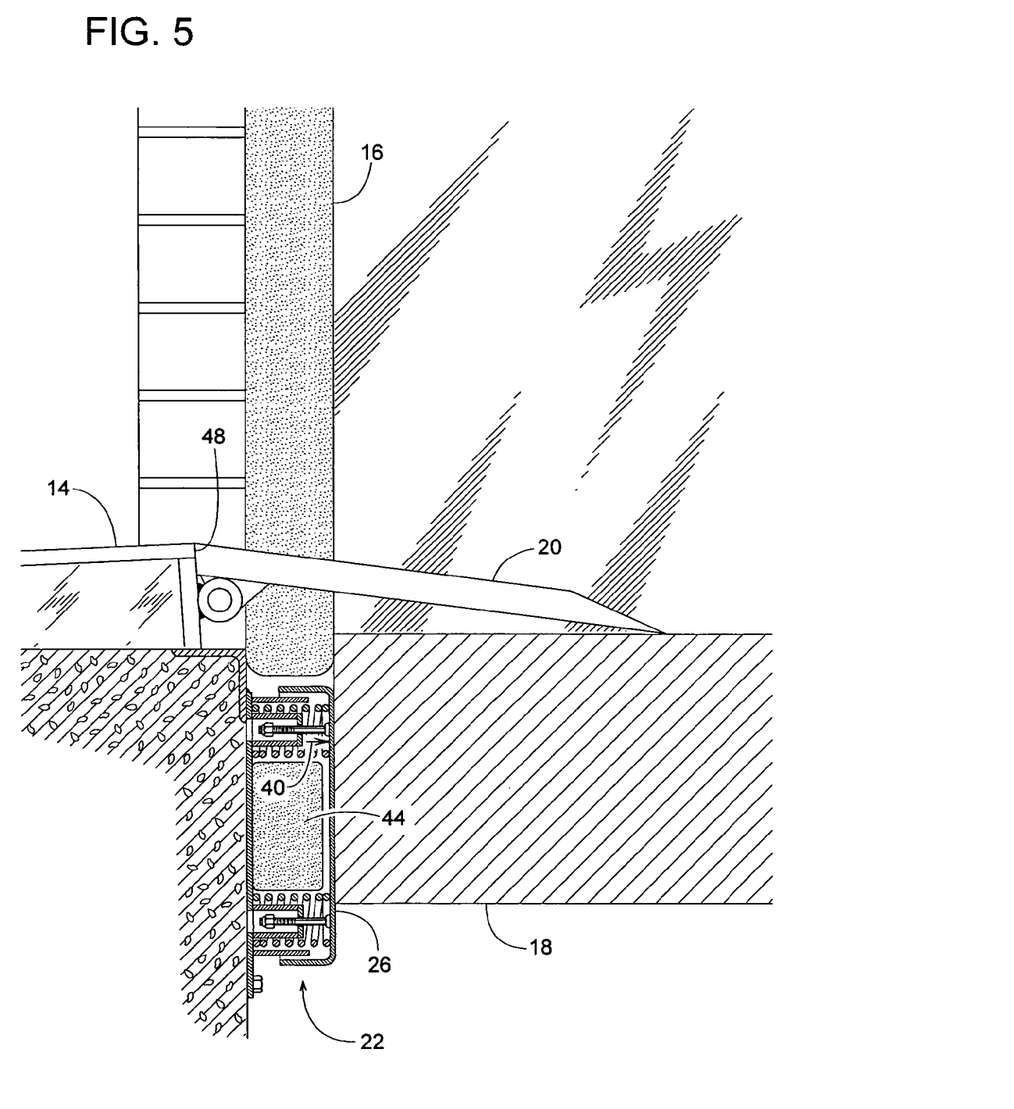
FIG. 5 is a cross-sectional view similar to FIG. 2 but showing the bumper between the intermediate position and the normally extended position.

If vehicle 18 bounces forward or otherwise stops at a position somewhere between intermediate position 32 and the normally extended position 30, as shown in FIG. 5, restorative force 40 is able to push faceplate 26 in sealing contact up against the rear edge of vehicle 18. Also shown in FIG. 5 is dock seal 16 in sealing engagement with the rear surface of vehicle 18 and lip 20 in its extended position where the lip helps cover the gap between vehicle 18 and a front edge 48 of dock leveler 14. Together, bumper 22, dock seal 16 and lip 20 provide an effective seal between vehicle 18 and wall 24.

Although the bumper and sealing operation just described could be accomplished in various ways, in one embodiment, bumper 22 comprises a base 50, a housing 52, compressible core 44, one or more guide tubes 54, one or more guide rods 56, one or more springs 42, and faceplate 26. Base 50 can be attached to dock 12 by a weld joint 58, fastener 60, and/or some other suitable means for attachment. Housing 52 extends from base 50 and helps protect the interior of bumper 22. Guide tube 54, which can be welded to base 50, helps position spring 42 in a radial direction, and an end cap 62 of tube 54 helps guide rods 56 as faceplate 26 moves between its normally extended position 30 and compressed position 34. Guide rod 56 can be a threaded fastener with a head 64 welded to faceplate 26. In this example, spring 42 is a compression spring that urges faceplate 26 away from base 50. A lock nut 66 can be screwed onto a threaded end of rod 56 to limit the distance that spring 42 can force faceplate 26 away from base 50. A gap 68 between compressible core 44 and faceplate 26 defines the travel distance between the normally extended position 30 and the intermediate position 32.

To avoid having vehicle 18 bounce off bumper 22 while operating within its sealing range 36, the lower restorative 40 provided by spring 42 is of magnitude that is appreciably less than that of the high restorative force 46 provided by core 44 when faceplate 26 is at compressed position 34. High restorative force 46 is preferably at least twice as great as lower restorative force 40 when faceplate 26 is at compressed position 34.

In order for bumper 22 to exert a sealing force of an appropriately light magnitude and do so over a sufficient travel distance, and in order to exert a substantial force sufficient to stop vehicle 18 within a reasonable distance, spring 42 provides a first compression rate that is less than a second compression rate provided by compressible core 44. A compression rate is defined as the change in restorative force per a given travel distance. When the restorative force is provided by a spring, the compression rate can be considered equivalent to a spring rate. The second compression rate of core 44 is preferably at least twice as great as the first compression rate of springs 42. Combined, the dual compression rates provide bumper 22 with an overall nonlinear compression rate as impactable surface 28 is forced from the normally extended position 30 to the compressed position 34.

Even though the restorative force within the sealing range may be relatively light, faceplate 26 is still preferably made of metal for durability while operating in the impact-absorbing range as well as the sealing range.

Figure 6:
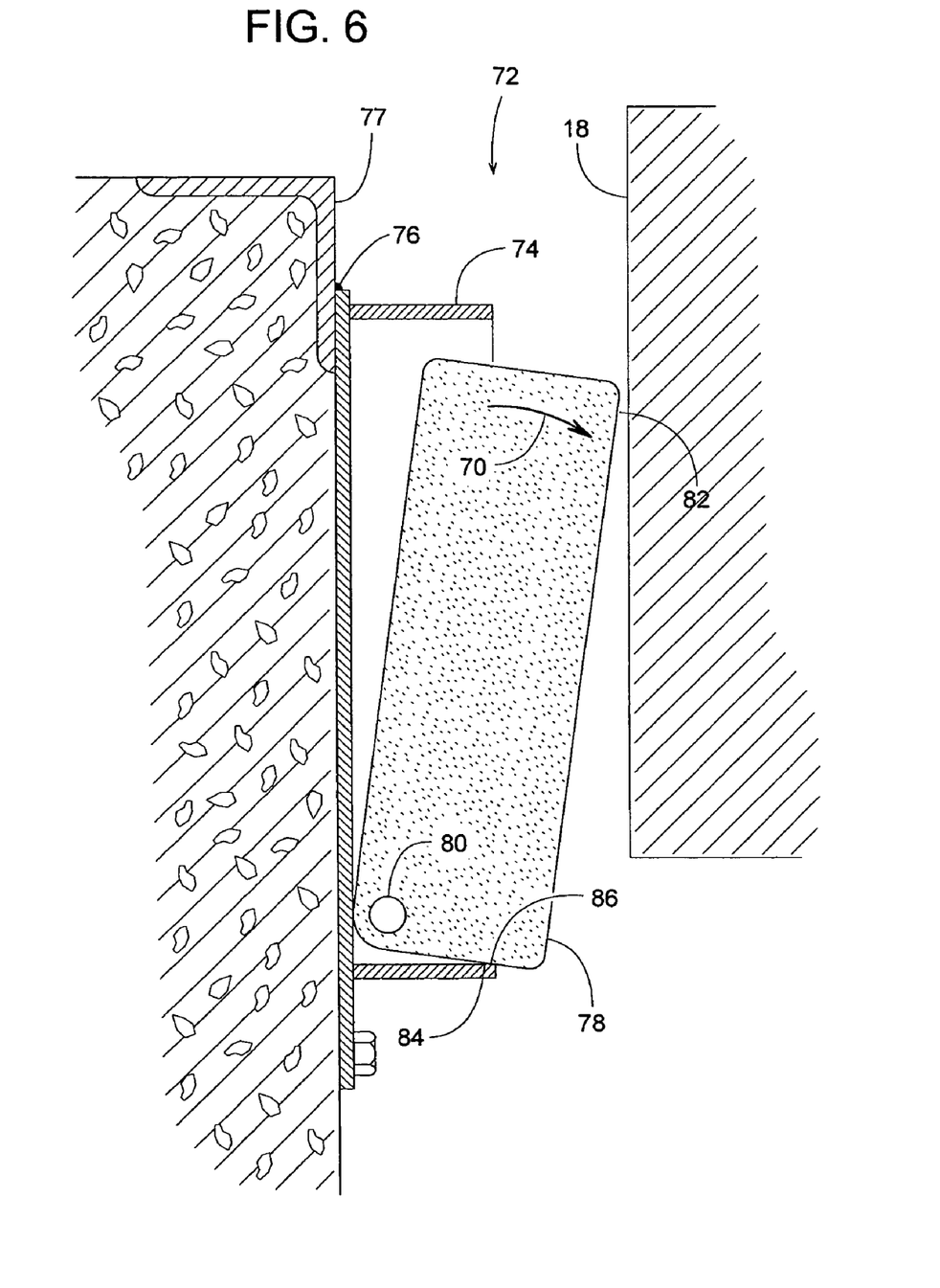
FIG. 6 is a cross-sectional view showing an alternate embodiment of a bumper at a normally extended position.
Figure 7:
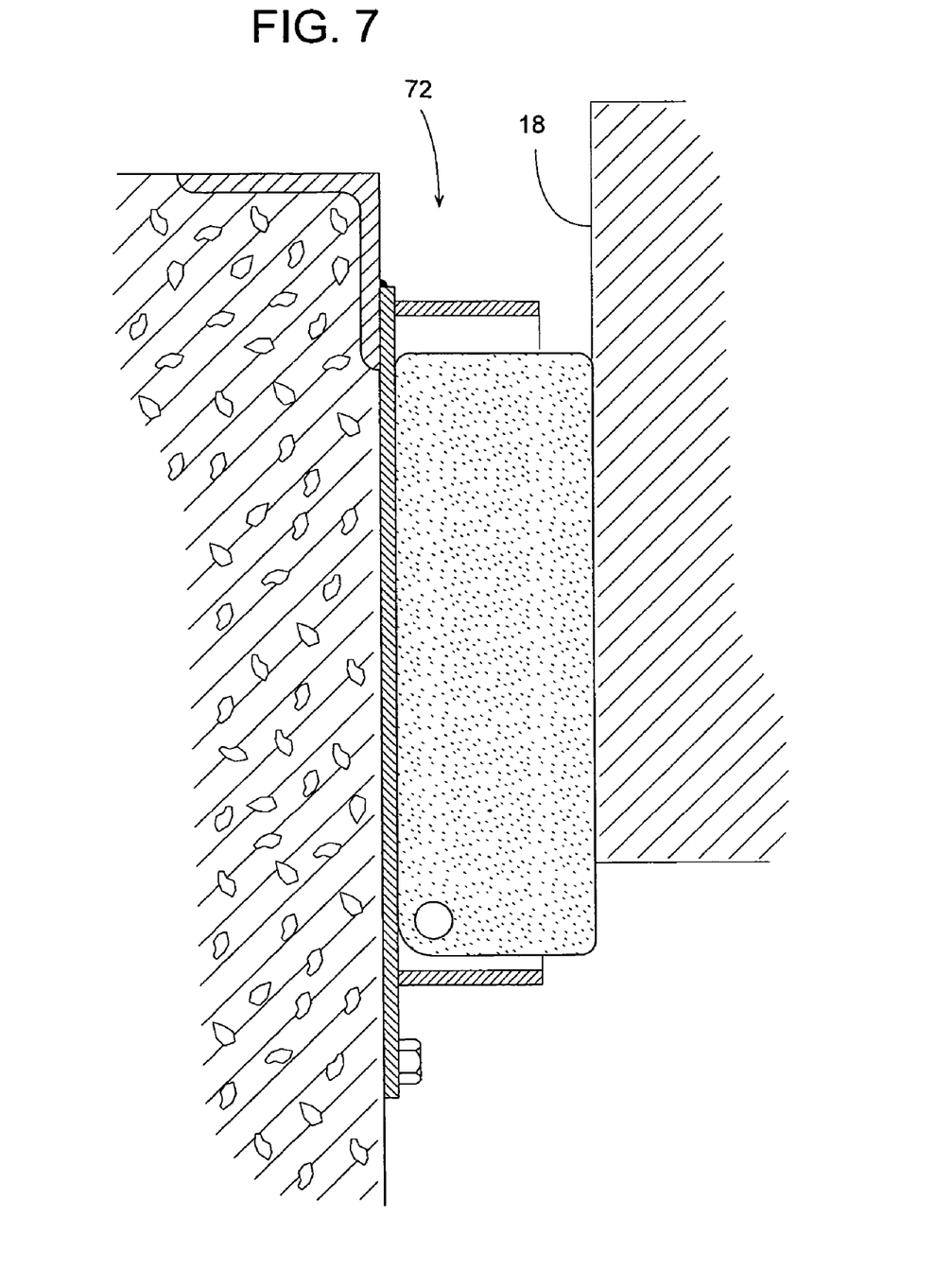
FIG. 7 is a cross-sectional view similar to FIG. 6 but showing the bumper at an intermediate position.
Figure 8:
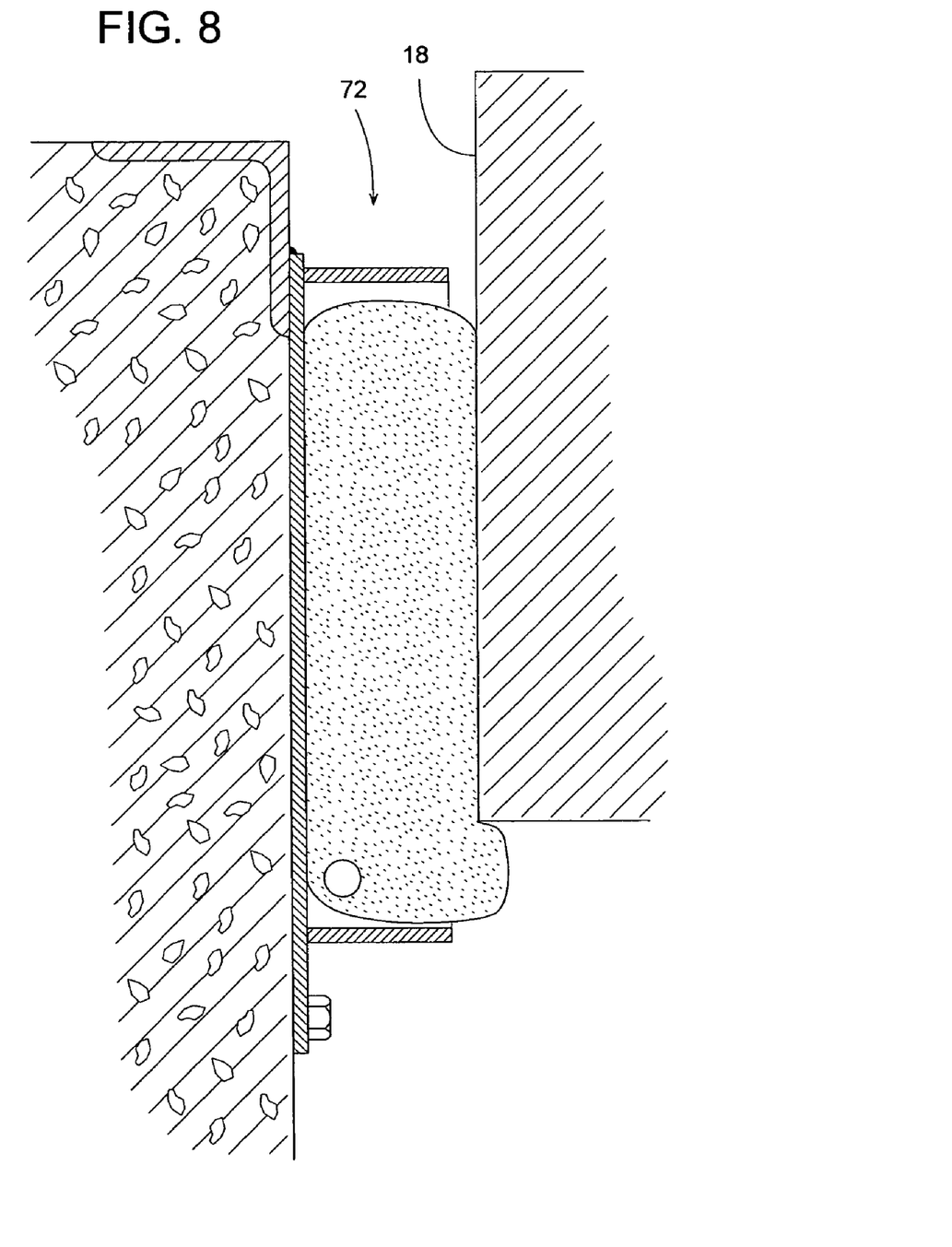
FIG. 8 is a cross-sectional view similar to FIG. 6 but showing the bumper at a compressed position.

In an alternate embodiment, shown in FIGS. 6, 7 and 8, the restorative force 70 of a bumper 72 operating in the sealing range is provided by gravity. FIG. 6 shows bumper 72 in a normally extended position, FIG. 7 shows bumper 72 at an intermediate position, and FIG. 8 shows bumper 72 in a compressed position. Bumper 72 operates in a sealing range when the bumper is between its positions of FIGS. 6 and 7. And bumper 72 operates in an impact-absorbing range when the bumper is between its positions of FIGS. 7 and 8.

The operation of bumper 72 is similar to that of bumper 22 with FIGS. 6, 7 and 8 corresponding to FIGS. 2, 3, and 4 respectively. In this example, bumper 72 includes a housing 74 whose base 76 is attached to a dock face 77. A compressible core 78 made of plastic, rubber, or some other compressible material is pivotally connected to housing 74 by way of a pin 80. The weight of core 78 urges the core to pivot forward about pin 80 until an impactable surface 82 of core 78 engages the rear edge of vehicle 18 or some other feature limits the core's forward pivotal motion. The forward pivotal motion, for example, could be limited by a lower surface 84 of core 78 engaging an adjacent surface 86 of housing 74.

Figure 9:
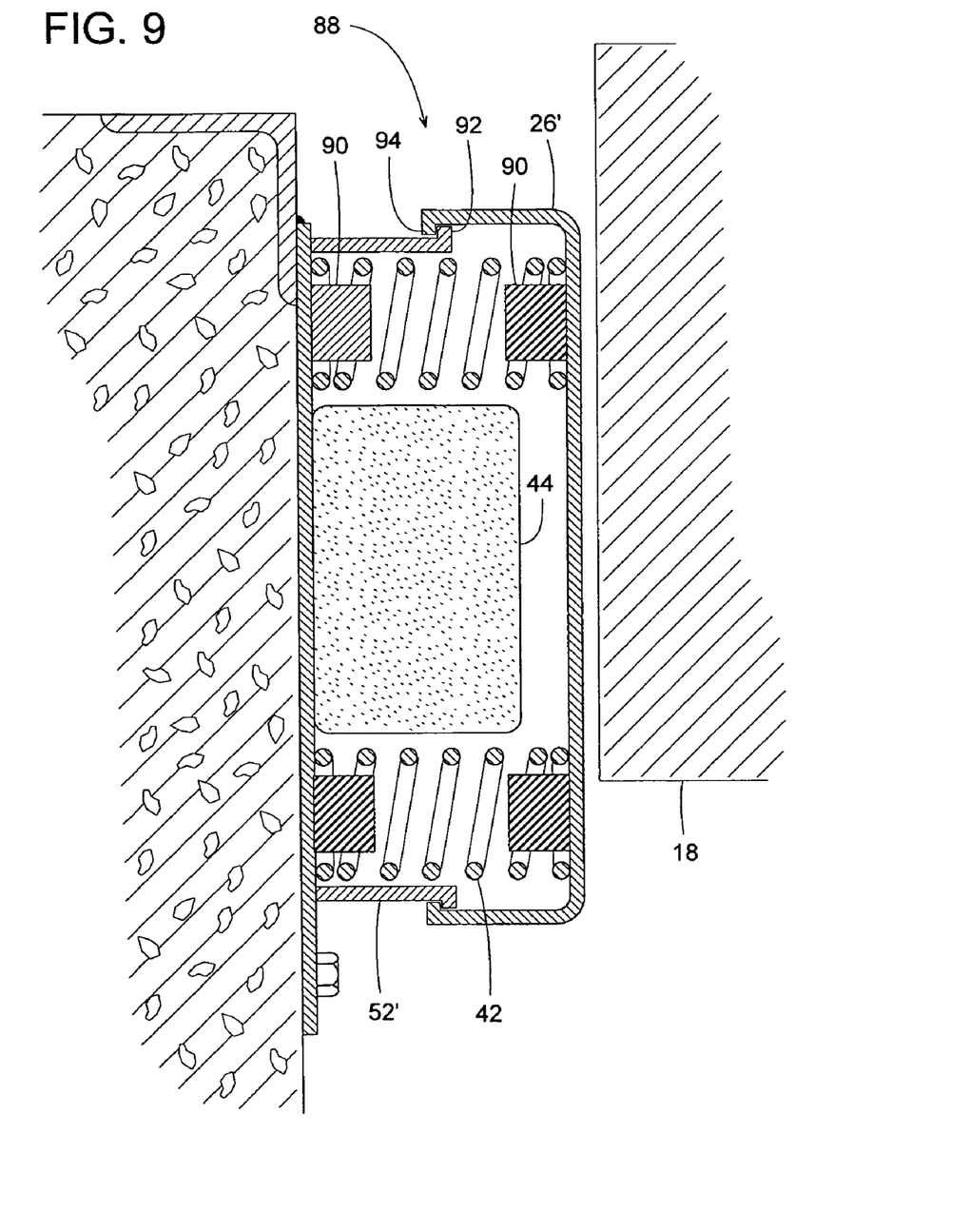
FIG. 9 is cross-sectional view showing another alternate embodiment of a bumper at a normally extended position.
Figure 10:
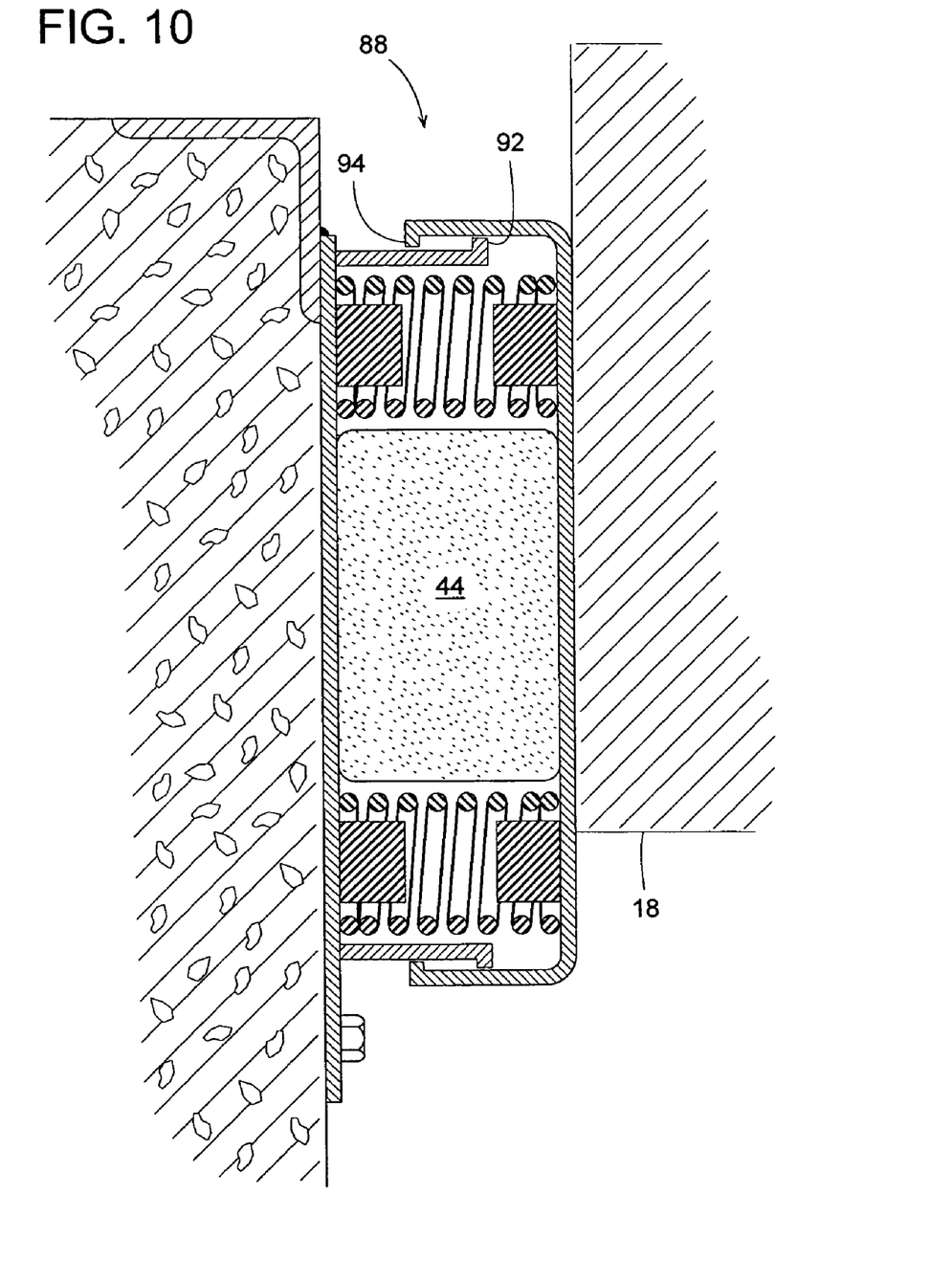
FIG. 10 is a cross-sectional view similar to FIG. 9 but showing the bumper at an intermediate position.
Figure 11:
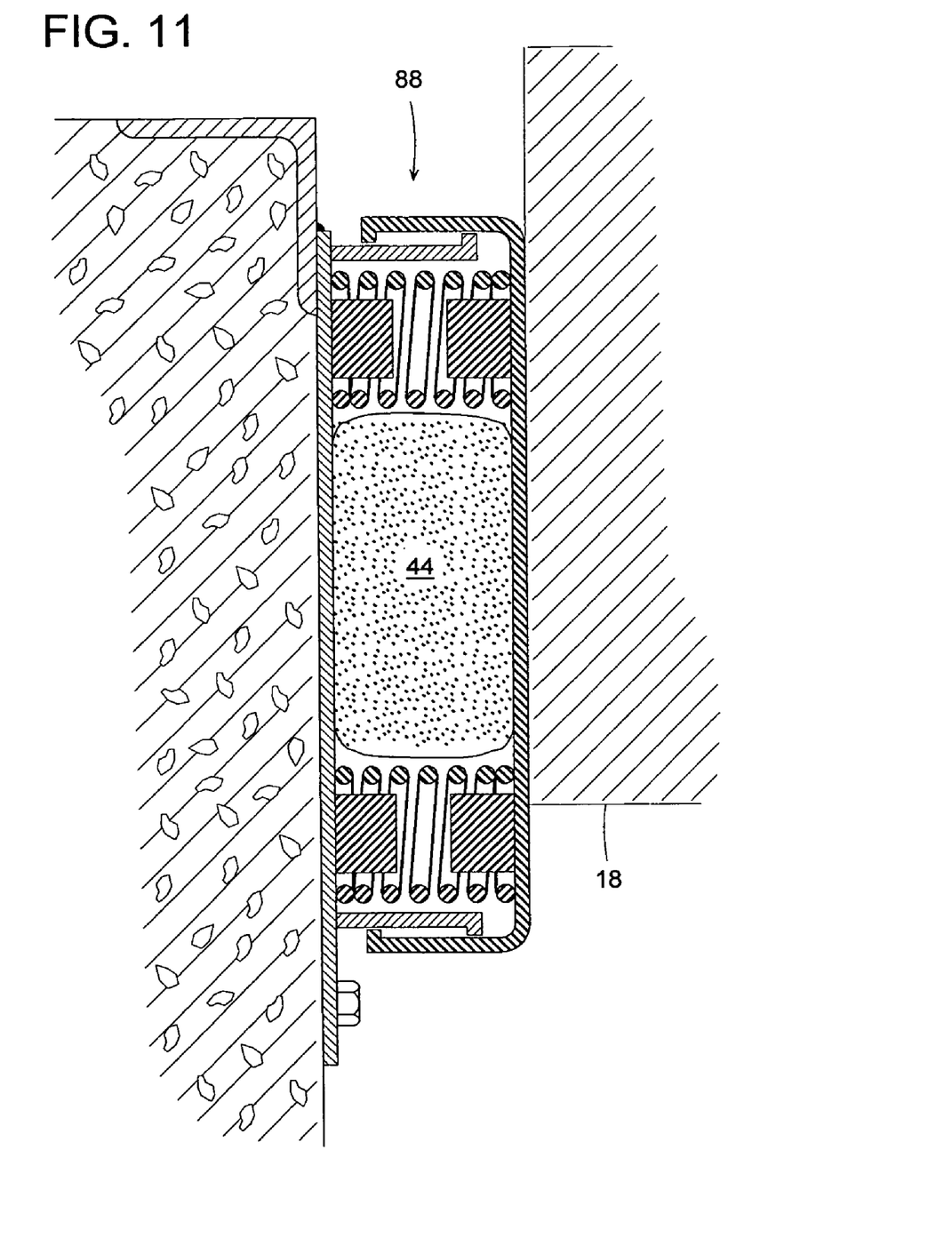
FIG. 11 is a cross-sectional view similar to FIG. 9 but showing the bumper at a compressed position.

FIGS. 9, 10 and 11 illustrate yet another embodiment of a bumper. These drawing figures show a bumper 88 that is similar to bumper 22 with FIGS. 9, 10, and 11 corresponding to FIGS. 2, 3 and 4 respectively. In this example, spring 42 urges a faceplate 26' forward, while a lip 92 on a housing 52' engages a lip 94 on faceplate 26' to limit the forward movement of faceplate 26'. Instead of guide tubes 54, bumper 88 includes guide blocks 90 that help hold spring 42 in position. Although bumpers 88 and 22 function basically the same way, bumper 88 can be made with fewer component parts.

It should be noted that a significant benefit of bumpers 22, 72, and 88 as well as other variations thereof, is that the bumpers are particularly suited for engaging irregular or off-centered vehicles and trailers. When the rear surface of the vehicle, for instance, is non-parallel to a dock face with two bumpers, the face plates of the bumpers can extend different amounts so that both face plates still engage the vehicle.

Although the invention is described with respect to various embodiments, including a preferred one, modifications thereto will be apparent to those of ordinary skill in the art. Therefore, the scope of the invention is to be determined by reference to the following claims.

We claim:

1. A bumper to receive an impact from a vehicle at a loading dock, the bumper comprising:
   a base to be attached to the loading dock;
   an impactable plate coupled to the base and being impactable by the vehicle, wherein the impactable plate is moveable between a normally extended position and an intermediate position and is further moveable between the intermediate position and a compressed position, wherein the intermediate position is between the normally extended position and the compressed position;
   a helical spring interposed between the impactable plate and the base to absorb the impact and to provide a first restorative force;
   a compressible core interposed between the impactable plate and the base to absorb the impact and to provide a second restorative force, wherein the impactable plate is spaced-apart from the compressible core in the normally extended position, such that the compressible core does not exert a force on the impactable plate, but is in contact with the compressible core in the compressed position;
   a guide tube coupled to the base to protrude substantially perpendicularly from the base, the helical spring surrounding at least a portion of the guide tube to at least partially position the helical spring relative to the impactable plate; and
   a guide rod coupled to the impactable plate to protrude substantially perpendicularly from the impactable plate, wherein the guide rod interacts with the guide tube to at least partially guide movement of the impactable plate between the normally extended, intermediate, and compressed positions.

2. The bumper of claim 1, wherein the helical spring has a first compression rate and the compressible core has a second compression rate, wherein the second compression rate is at least twice as great as the first compression rate.

3. The bumper of claim 1, wherein the bumper provides a nonlinear compression rate as the impactable plate moves from the normally extended position to the compressed position.

4. The bumper of claim 1, wherein the impactable plate is a metal faceplate.

5. The bumper of claim 1, wherein the compressible core is comprised of a polymer.

6. The bumper of claim 1, wherein the helical spring is in contact with the impactable plate when the impactable plate is in the normally extended position, the intermediate position, and the compressed position.

7. The bumper of claim 1, wherein the second restorative force urges the impactable plate from the compressed position toward the intermediate position, wherein the impactable plate is further responsive to the first restorative force that urges the impactable plate from the intermediate position to the normally extended position, wherein the first restorative force is of a magnitude that is appreciably less than that of the second restorative force when the impactable plate is at the compressed position.

8. The bumper of claim 1, wherein the guide rod extends through an end of the guide tube and is moveable coupled thereto to at least partially guide the movement of the impactable plate between the normally extended, intermediate, and compressed position.

9. The bumper of claim 1, wherein the compressible core is spaced-apart from the guide tube and the guide rod.

10. The bumper of claim 1, wherein the impactable plate is in direct contact with the compressible core in the compressed position.

* * * * *